United States Patent [19]

Scholz et al.

[11] Patent Number: 4,598,943
[45] Date of Patent: Jul. 8, 1986

[54] VEHICLE SUN VISOR

[75] Inventors: Hans-Jürgen Scholz, Waldenbuch; Luigi Brambilla, Böblingen; Egon Katz, Nagold; Alban Bossenmaier, Stuttgart; Gerhard Zweigart, Aidlingen, all of Fed. Rep. of Germany

[73] Assignee: Daimler-Benz Aktiengesellschaft, Fed. Rep. of Germany

[21] Appl. No.: 664,753

[22] Filed: Oct. 25, 1984

[30] Foreign Application Priority Data

Oct. 26, 1983 [DE] Fed. Rep. of Germany .... 33 38 774

[51] Int. Cl.⁴ .............................................. B60J 3/02
[52] U.S. Cl. ............................... 296/97 H; 296/97 K; 296/97 B
[58] Field of Search ................. 296/97 R, 97 B, 97 H, 296/97 K, 97 F, 97 G, 97 J; 160/DIG. 3

[56] References Cited

U.S. PATENT DOCUMENTS 3,188,112  6/1965  Oelkrug .......................... 296/97 RX
3,366,413  1/1968  Demarais ......................... 296/97 H
3,542,416  11/1970 Nelson et al. .................... 296/97 H
4,178,035  12/1979 Cziptschirsch ................... 296/97 R
4,411,467  10/1983 Cziptschirsch et al. .......... 296/97 H

FOREIGN PATENT DOCUMENTS 2,741,901  3/1979  Fed. Rep. of Germany .... 296/97 B
2389507   1/1979  France ............................. 296/97 K
2495066   6/1982  France ............................. 296/97 K
0021914   2/1981  Japan ............................... 296/97 H
1041710   9/1966  United Kingdom ............. 296/97 H
1087116   10/1967 United Kingdom ............. 296/97 H
1208983   10/1970 United Kingdom ............. 296/97 H Primary Examiner—Robert B. Reeves
Assistant Examiner—Russell D. Stormer
Attorney, Agent, or Firm—Barnes & Thornburg

[57] ABSTRACT

With a sun visor comprised of a cushioned tube and housing swivel bearings at both ends, the tube is designed as an energy absorption member for eliminating head injuries due to an accident, and is designed as the only connection between the swivel bearings.

7 Claims, 2 Drawing Figures

VEHICLE SUN VISOR

BACKGROUND AND SUMMARY OF THE INVENTION

The invention relate to a vehicle sun visor including a continuous tubular husing or tube in its interior extending over a major portion of the length of the sun visor and being covered by cushioning material, said tubular housing being borne by swivel bearings received at its ends.

A sun visor of the above-noted kind is disclosed in German Published Unexamined Patent Application (DE-OS) No. 15 80 850 wherein the swivel bearings are connected to each other by means of a joint rod within the tube. With a frontal crash, the danger exists that persons seated in the front seats and not wearing a seat belt or only retained by an inflatable cushion, especially if such persons are so-called "seating giants" (very tall persons) and/or sit in an auto or vehicle with a low roof clearance, incur a head injury by colliding in the area of the swivel axle of the sun visor which is in a region outside of the generally well cushioned body of the sun visor. Such a collision can lead to extensive head injuries with a sun visor of the aforementioned kind.

It is an object of the invention to so design a sun visor that even with a head impact in the area of the tube-shaped swivel axle positioned in front of a vehicle cross bearer, any serious injury is not to be expected.

Therefore, a sun visor of the above-mentioned kind is proposed by the invention wherein the swivel bearings are connected only via the tube and said tube is formed as an energy absorption member.

A high degree of collision energy absorption is attained according to preferred embodiments wherein the tube consists of sheet metal. A tube diameter of about 30 mm and a thickness of about 0.6 mm has proven to be most effective.

Good results were also achieved when the tube was formed in the manner of a corrugated tube.

Further objects, features, and advantages of the present invention will become apparent from the following description when taken with the accompanying drawings which show, for purposes of illustration only, embodiments construction in accordance with the present invention.

DETAILED DESCRIPTION OF THE DRAWINGS

Figure 1:
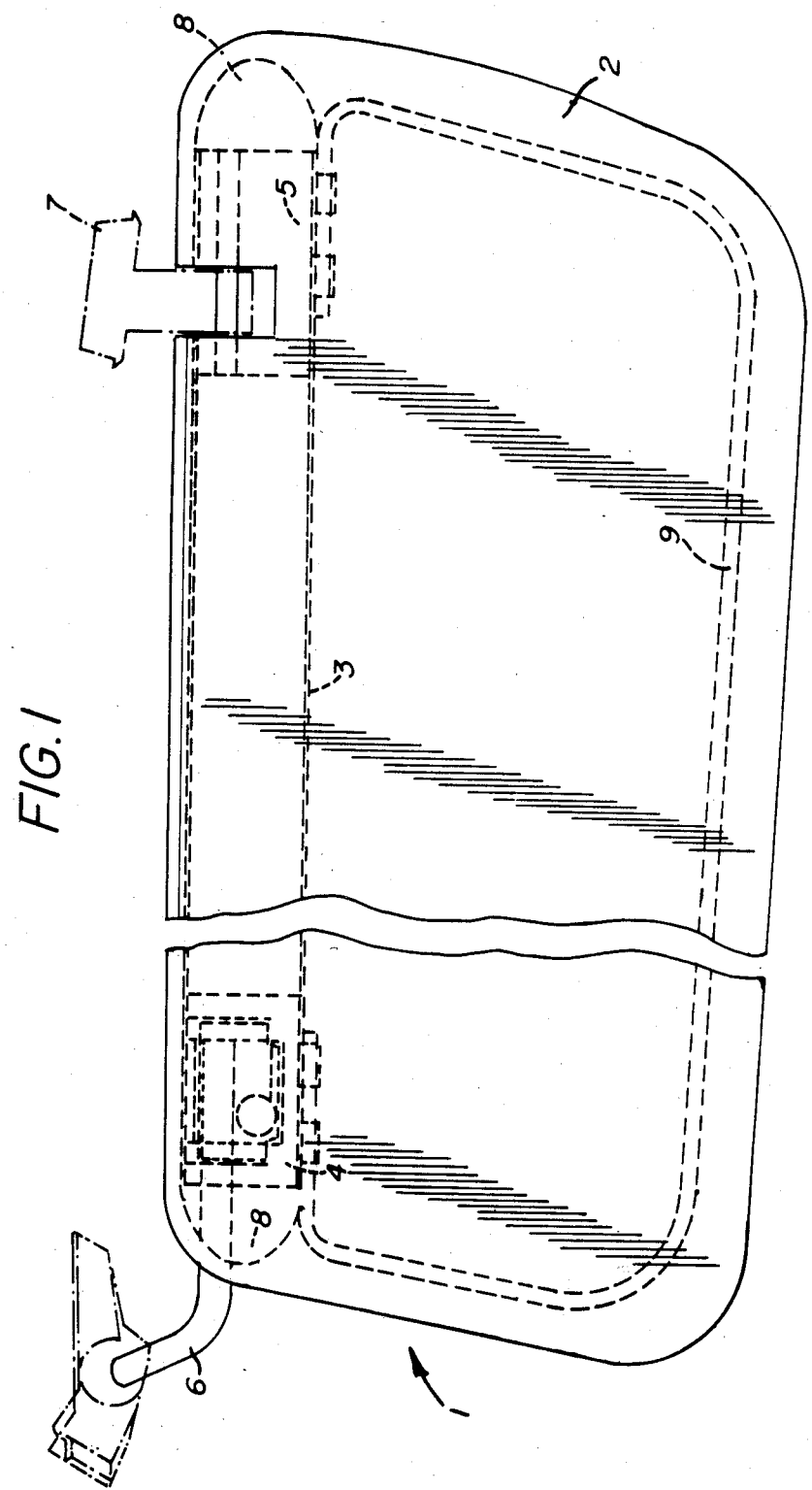
FIG. 1 is a frontal view of a sun visor having a tube which is energy absorbant and contains swivel bearings at either side constructed in accordance with a preferred embodiment of the present invention.

The sun visor 1 according to FIG. 1 includes in its upper area a tube 3 wich extends almost over the entire length and is surrounded by cushioning material 2. The tube 3 is provided with swivel bearings 4 and 5 at either end, wherein the left swivel bearing 4 is supported via an arm 6, swivably borne in a not further illustrated manner at a stationary vehicle body part. The right swivel bearing 5 is formed as a solid bearing so that the sun visor 1 is not swivable about a vehicle vertical axis.

The position of the sun visor is thereby always insured and a head impact upon the vehicle cross bearer 10 positioned behind the sun visor 1 is alleviated by means of the energy absorbing tube 3.

A wire frame 9 is fixedly attached to the tube 3. Pipe 3 is closed by rounded end pieces 8 on either side and forms the only connection between the swivel bearings 4 and 5. The wired frame 9 together with an insert consisting for example of hard board which is not further illustrated here, stiffens the sun visor 1 in the area adjoining the tube 3.

Figure 2:
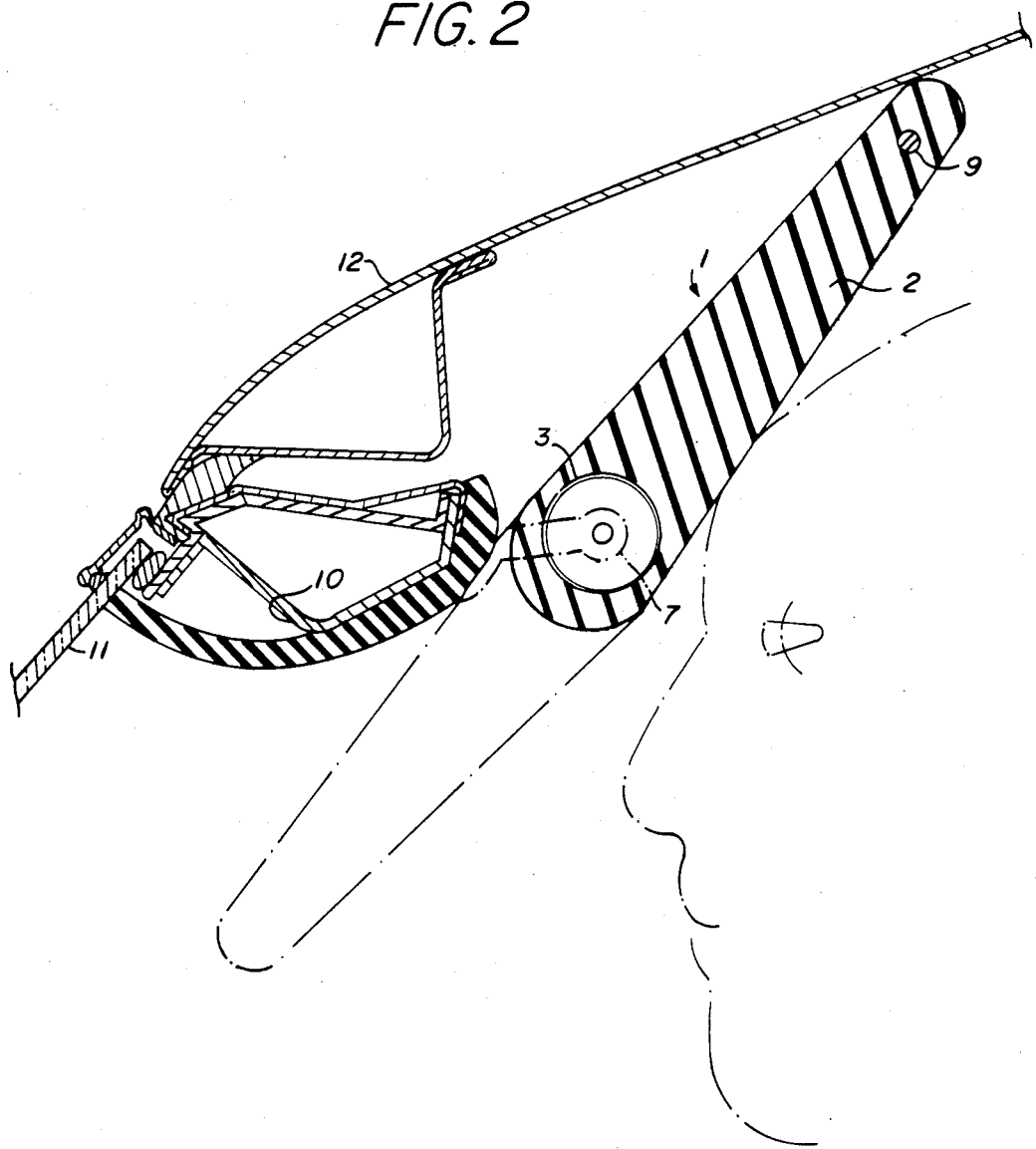
FIG. 2 is a cross sectional view in vertical direction through the sun visor of FIG. 1 and the adjacent roof area of a motor vehicle when in the use position.

FIG. 2 shows the arrangement of a sun visor 1 in its two extreme swivel positions, wherein an upper vehicle cross bearer is then designated with reference numeral 10 and the front window with reference numeral 11. The roof area adjacent to the cross bearer 10 bears the reference numeral 12. In the event the sketched in head area of a vehicle driver or passenger hits against the sun visor 1 in the event of a frontal crash, the tube 3 is smashed between the two swivel bearings 4 and 5 and plastically deformed absorbing the power of impact based on its design and dimensioning without the occurrence of a dangerously high power peak.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Sun visor arrangement for motor vehicles comprising:
    a support tube extending over the major portion of the length of the sun visor configured to serve as an energy absorptive member,
    cushioning material surrounding the support tube,
    and bearing receptacle means at each end of the support tube for accomodating swivel bearing means and being connected with each other only by said energy absorptive support tube.

2. Sun visor arrangement according to claim 1, wherein the support tube is formed of sheet metal.

3. Sun visor arrangement according to claim 1, wherein the support tube is formed as a corrugated tube so as to facilitate energy absorption.

4. Sun visor arrangement according to claim 2, wherein the support tube is formed as a corrugated tube so as to facilitate energy absorption.

5. Sun visor arrangement according to claim 1, wherein said support tube has a tube diameter of about 30 mm and a thickness of about 0.6 mm.

6. Sun visor arrangement to claim 4, wherein said support tube has a tube diameter of about 30 mm and a thickness of about 0.6 mm.

7. Sun visor arrangement according to claim 1, further comprising swivel bearing means disposed in the bearing receptacle means, said bearing means being attached to vehicle roof support means such that said sun visor is pivotable about only a generally horizontal vehicle axis.

* * * * *